(12) United States Patent
Miettinen

(10) Patent No.: US 10,100,157 B2
(45) Date of Patent: Oct. 16, 2018

(54) METHOD FOR MAKING A LIGNIN COMPONENT, A LIGNIN COMPONENT AND ITS USE AND A PRODUCT

(71) Applicant: UPM-Kymmene Corporation, Helsinki (FI)

(72) Inventor: Mauno Miettinen, Lappeenranta (FI)

(73) Assignee: UPM-Kymmene Corporation, Helsinki (FI)

( * ) Notice: Subject to any disclaimer, the term of this patent is extended or adjusted under 35 U.S.C. 154(b) by 0 days.

(21) Appl. No.: 15/593,471

(22) Filed: May 12, 2017

(65) Prior Publication Data

US 2017/0247514 A1    Aug. 31, 2017

Related U.S. Application Data

(63) Continuation of application No. 14/363,976, filed as application No. PCT/FI2012/051210 on Dec. 5, 2012, now Pat. No. 9,688,824.

(30) Foreign Application Priority Data

Dec. 9, 2011 (FI) ...................................... 20116253
Jun. 25, 2012 (FI) ...................................... 20125703

(51) Int. Cl.
C07G 1/00 (2011.01)
C08H 7/00 (2011.01)
D21C 11/00 (2006.01)

(52) U.S. Cl.
CPC ................. *C08H 6/00* (2013.01); *C07G 1/00* (2013.01); *D21C 11/0007* (2013.01)

(58) Field of Classification Search
CPC ............................... C07G 1/00; D21C 11/0007
See application file for complete search history.

(56) References Cited

U.S. PATENT DOCUMENTS

| | | |
|---|---|---|
| 3,817,974 A | 6/1974 | Sirianni et al. |
| 3,984,362 A | 10/1976 | Sirianni et al. |
| 4,007,004 A | 2/1977 | Bailey et al. |
| 4,168,252 A | 9/1979 | Makino |
| 4,265,809 A | 5/1981 | Holsopple et al. |
| 4,320,036 A | 3/1982 | Gobran et al. |
| 4,332,589 A | 6/1982 | Lin |
| 4,374,738 A | 2/1983 | Kelley |
| 4,670,482 A | 6/1987 | Dilling |
| 4,740,590 A | 4/1988 | Dilling |
| 4,740,591 A | 4/1988 | Dilling et al. |
| 4,891,070 A | 1/1990 | Dilling et al. |
| 5,188,665 A | 2/1993 | Schilling |
| 5,755,830 A | 5/1998 | Dilling et al. |
| 2003/0156970 A1 | 8/2003 | Oberkofler et al. |
| 2004/0244925 A1 | 12/2004 | Tarasenko |
| 2008/0121356 A1 | 5/2008 | Griffith et al. |
| 2008/0214796 A1 | 9/2008 | Tomani et al. |
| 2009/0038212 A1 | 2/2009 | Cooper |
| 2010/0166968 A1 | 7/2010 | Doherty et al. |
| 2010/0203605 A1 | 8/2010 | Kim et al. |
| 2010/0305241 A1 | 12/2010 | Balakshin et al. |
| 2010/0325947 A1 | 12/2010 | Ohman et al. |
| 2011/0297340 A1 | 12/2011 | Kouisni et al. |
| 2012/0006321 A1 | 1/2012 | McKean |
| 2012/0325203 A1 | 12/2012 | Griffin et al. |
| 2013/0131326 A1 | 5/2013 | Hannus et al. |
| 2013/0203972 A1 | 8/2013 | Miettinen |
| 2013/0331555 A1 | 12/2013 | Malkki et al. |
| 2014/0187760 A1 | 7/2014 | Pu |
| 2014/0357847 A1 | 12/2014 | Wallmo et al. |
| 2015/0041083 A1 | 2/2015 | Yoshikawa et al. |
| 2015/0119559 A1 | 4/2015 | Ohman et al. |

FOREIGN PATENT DOCUMENTS

| | | |
|---|---|---|
| CN | 101952504 A | 1/2011 |
| EP | 0 364 632 A1 | 4/1990 |
| EP | 0 448 599 B1 | 2/1994 |
| EP | 2 336 195 A1 | 6/2011 |
| WO | WO 2006/031175 A1 | 3/2006 |
| WO | WO 2008/017145 A1 | 2/2008 |
| WO | WO 2009/028969 A1 | 3/2009 |
| WO | WO 2009/104995 A1 | 8/2009 |
| WO | WO 2011/140222 A1 | 11/2011 |
| WO | WO 2011/149341 A1 | 12/2011 |

(Continued)

OTHER PUBLICATIONS

Chinese Office Action for corresponding Chinese Patent Application No. 201280069340.9 dated Jul. 4, 2017, 20 pages, English translation.

International Search Report for corresponding International Patent Application No. PCT/FI2012/051210 dated Mar. 17, 2014.

Written Opinion of the International Searching Authority for corresponding International Patent Application No. PCT/FI2012/051210 dated Mar. 17, 2014.

Finnish Search Report for corresponding Finnish Patent Application No. 20116253 dated Oct. 30, 2012.

Finnish Search Report for corresponding Finnish Patent Application No. 20125703 dated Apr. 26, 2013.

Chinese Office Action for corresponding Chinese Patent Application No. 201280069340.9 dated Sep. 29, 2015, with English translation, 28 pages.

(Continued)

*Primary Examiner* — Liam J Heincer
(74) *Attorney, Agent, or Firm* — Merchant & Gould P.C.

(57) ABSTRACT

The invention relates to a method for making a lignin component from lignin material by an acid treatment, the method comprising: subjecting the lignin material to at least one acid treatment stage by mixing the lignin material with an acid composition to produce an acid treatment mixture, wherein at least one acid treatment stage has a retention time over 6 hours and wherein the acid treatment mixture is held at a temperature of over 60° C. and a pH of 0.5-4 for the retention time of the acid treatment in order to increase dry solids content of the lignin component and decrease ash and carbohydrates of the lignin component. Further, the invention relates to corresponding lignin components, a use of the lignin component and a product.

15 Claims, 14 Drawing Sheets

(56) References Cited

FOREIGN PATENT DOCUMENTS

WO  WO 2012/005677 A1  1/2012
WO  WO 2012/049375 A1  4/2012

OTHER PUBLICATIONS

Chinese Office Action for corresponding Chinese Patent Application No. 201280069340.9 dated Jun. 21, 2016, 5 pgs, English translation.
Finnish Office Action for corresponding Finnish Patent Application No. 20126273 dated Nov. 17, 2017, 4 pages.

METHOD FOR MAKING A LIGNIN COMPONENT, A LIGNIN COMPONENT AND ITS USE AND A PRODUCT

This application is a Continuation of U.S. patent application Ser. No. 14/363,976, filed 9 Jun. 2014, which is a National Stage Application of PCT/FI2012/051210, filed 5 Dec. 2012, which claims benefit of Serial No. 20116253, filed 9 Dec. 2011 in Finland and Serial No. 20125703, filed 25 Jun. 2012 in Finland which applications are incorporated herein by reference. To the extent appropriate, a claim of priority is made to each of the above disclosed applications.

FIELD OF THE INVENTION

The invention relates to a method for manufacturing a lignin component. Further, the invention relates to a lignin component and a use of the lignin component. Further, the invention relates to a product.

BACKGROUND OF THE INVENTION

Known from publication WO 2006/031175 is a method for separation of lignin from black liquor.

OBJECTIVE OF THE INVENTION

The objective of the invention is to disclose a new method for manufacturing a lignin component. Another objective of the invention is to produce a lignin component with improved properties and a product comprising the lignin component.

SUMMARY OF THE INVENTION

The method for making a lignin component from a lignin material according to the present invention is characterized by what is presented in claims.

The lignin component according to the present invention is characterized by what is presented in claims.

The use of the lignin component according to the present invention is characterized by what is presented in claims.

The product according to the present invention is characterized by what is presented in claims.

BRIEF DESCRIPTION OF THE FIGURES

The accompanying figures, which are included to provide a further understanding of the invention and constitutes a part of this specification, illustrate some embodiments of the invention and together with the description help to explain the principles of the invention. In the figures.

DETAILED DESCRIPTION OF THE INVENTION

In the method of the present invention a lignin component is made from lignin material by an acid treatment, the method comprising: forming a lignin component of lignin material by treating the lignin material in at least one acid treatment stage; and optimizing process conditions by means of a combination of process parameters comprising retention time, temperature and pH level at the acid treatment stage so that the retention time is over 6 hours during at least one acid treatment stage.

Figure 1:
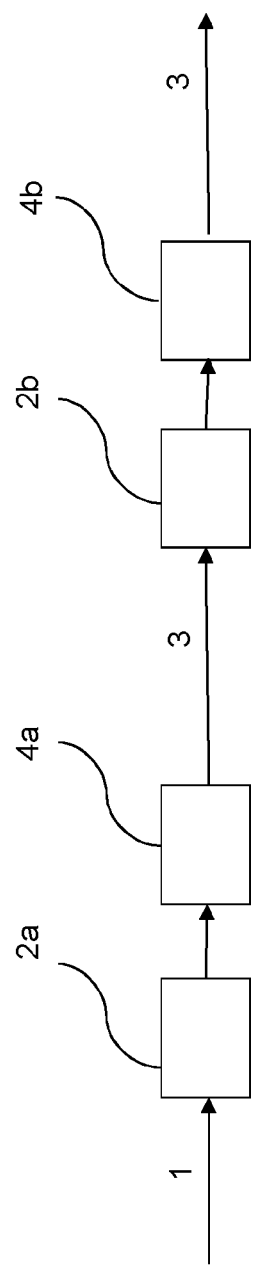
FIG. 1 is a flow chart illustration of a method according to one embodiment of the present invention.
Figure 2:
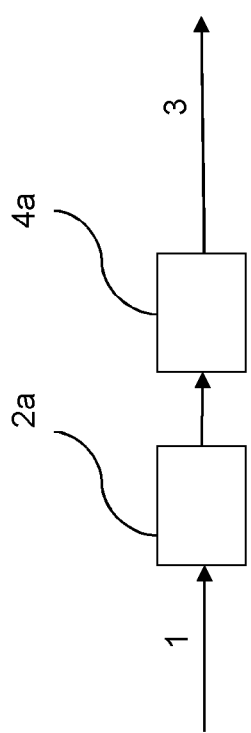
FIG. 2 is a flow chart illustration of a method according to another embodiment of the present invention.
Figure 3:
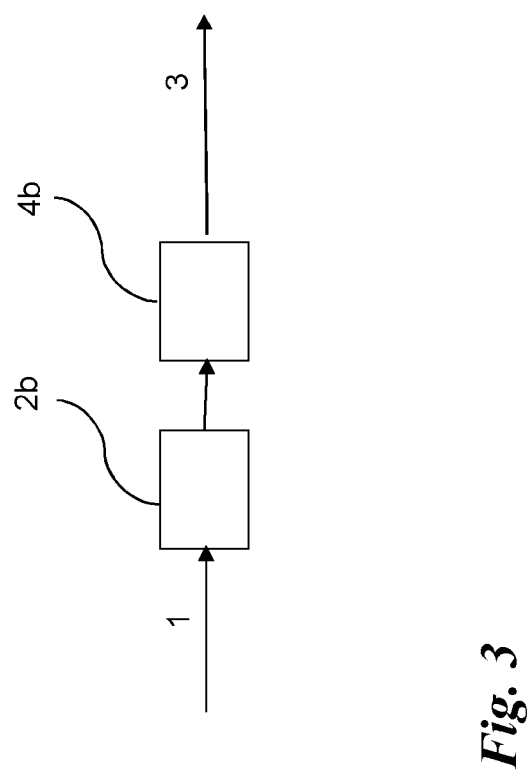
FIG. 3 is a flow chart illustration of a method according to another embodiment of the present invention.
Figure 4:
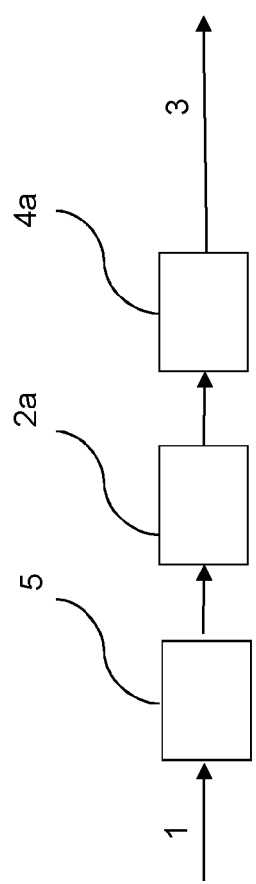
FIG. 4 is a flow chart illustration of a method according to another embodiment of the present invention.

One embodiment of the method of the present invention is shown in FIG. 1. Another embodiment of the method of the present invention is shown in FIG. 2. Another embodiment of the method of the present invention is shown in FIG. 3. Another embodiment of the method of the present invention is shown in FIG. 4. Further, lignin structures in cakes of lignin components are shown in FIGS. 5a-5d.

In the method of the present invention a lignin component is made from a lignin material (1) by a mild acid treatment. According to the invention, a lignin component (3) is formed of lignin material so that the lignin material (1) is treated in at least one acid treatment stage (2a,2b) and the at least one acid treatment stage is optimized by means of a combination of process parameters comprising retention time, e.g. long retention time, temperature, e.g. high temperature, and pH level, e.g. sufficient low, in order to decrease ash and/or carbohydrates in the lignin component, and preferably in order to remove undesired substance from the lignin component and to purify the lignin component.

The invention is specially based on improving properties of the lignin component. When the lignin material is acid treated at one or more acid treatment stage by optimizing retention time, temperature and pH level, then the properties, such as purity, dry solids content, filterability, amounts of carbohydrates and ash, of the lignin component can be improved. Further, odour in the lignin component can be decreased. Then it is provided the lignin component which is suitable to use in typical and special applications.

In this context, a lignin material refers any material or composition containing lignin. The lignin material may contain one or more material components. In one embodiment suitable and desired additives can be added into the lignin material to form a desired lignin component.

In one embodiment the lignin material includes material which is selected from a group consisting of lignin from alkaline pulping process, kraft lignin, lignin from soda process, lignin coming from a process in which lignin is separated the raw material by a solution including suitable chemicals and their combinations.

In one embodiment the lignin material includes flash precipitated lignin. In one embodiment flash precipitated lignin is obtained after $CO_2$-precipitation. Preferably, flash precipitated lignin is formed as disclosed in patent application PCT/FI2011/050896.

In one embodiment the lignin is precipitated from the black liquor by a continuous process with $CO_2$ at 3-8 bar overpressure. In one embodiment the lignin is separated by a flash precipitation lignin separation method, such as disclosed in patent application PCT/FI2011/050896. In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The residence time in the above method is under 300 s. The flash precipitated lignin particles, having a particle diameter of less than 2 μm, form agglomerates, which can be separated from black liquor using e.g. filtration. The flash precipitated lignin can be purified and/or activated if needed for the further processing. The flash precipitated lignin has many advantages, e.g. activity, dispersability, solubility, drainability and preservability. In one embodiment of the present invention, the lignin component is a flash precipitated kraft lignin. Preferably, the flash precipitated kraft lignin is undrained. Therefore the lignin has higher activity, and the lignin can be re-dissolved. The lignin needs only a very simple re-dispersing stage when it is added e.g. into an adhesive mixture. Also control of the amount of water in the lignin based composition is easier when the re-dispersing is easier. Further, the lignin is easier to handle in the process because the lignin is not dusty. Preferably, the flash precipitated kraft lignin has dry matter content of 50-80%.

In one embodiment the lignin material is treated chemically and/or mechanically before the at least one acid treatment stage of the present invention. In one embodiment the lignin material is precipitated before the at least one acid treatment stage. In one embodiment the lignin material is re-slurried before the at least one acid treatment.

In this context, a lignin component means product formed from lignin material in at one or more stages. Term "lignin component" is already used after the first treatment stage.

In this context, a carbohydrate refers any carbohydrates, especially hemicellulose.

In one embodiment the at least one acid treatment stage is acid washing (2a). In the acid washing an amount of ash can be decreased in the lignin component. Further, in the acid washing filterability of the lignin component can be enhanced. Further, in the acid washing dry solids content of the lignin component can be improved. Improved dry solid content of filter cake leads to lower energy consumption in drying and to lower consumption of water in washing to reach same purity. Also dryer can be smaller, which leads to savings in investment. Savings in water consumption is important, since likely washing water must be circulated back to evaporation plant. Also certain dry solid content is needed to maintain processability of lignin cakes. For applications requiring no drying, for example burning, the low content of water in filter cake is a benefit.

In one embodiment the at least one acid treatment stage is acid hydrolysis (2b). In the acid hydrolysis an amount of carbohydrates can be decreased in the lignin component. Further, in the acid hydrolysis an amount of ash can be still decreased in the lignin component. It is important that lignin softens before or during acid hydrolysis; then carbohydrates can be removed from the lignin component and the lignin component can be purified. The softening is preferably performed slowly in correct temperature to prevent condensation of lignin and formation of char. The softening can be carried out at wide pH range.

In one embodiment the lignin material (1) is treated at two acid treatment stages in which first stage is acid washing (2a) and second stage is acid hydrolysis (2b). The first stage can be a typical acid washing. Preferably, the second stage is a purification stage.

In this context, the acid washing refers to any acid washing method. In one embodiment the acid washing is performed with $H_2SO_4$, other acid or other suitable acidifying chemical. The optimization of the invention affects positively consumption of $H_2SO_4$ or other acid or other acidifying chemical.

In this context, the acid hydrolysis refers to any acid hydrolysis method. In one embodiment the acid hydrolysis is performed by means of $H_2SO_4$, or other suitable acidifying chemical, typically in the presence of water.

In one embodiment the lignin material is treated in the at least one acid treatment stage with $H_2SO_4$.

In one embodiment the method comprises two acid treatment method steps. In one embodiment the first step is a removal of ash and the second step is a removal of carbohydrates. In one embodiment the first step is a increasing of dry solids content in the lignin component and the second step is a removal of carbohydrates from the lignin component. In one embodiment the first step comprises a removal of ash and increasing of dry solids content in the lignin component, and the second step is a removal of carbohydrates from the lignin component.

In one embodiment the method comprises a pre-treatment step before the at least one acid treatment stage. In one embodiment the lignin material is re-slurried in the pre-treatment step. In a preferred embodiment the pre-treatment step is a softening step of lignin in which the lignin is softened and structure of the lignin is modified. An acid is able to hydrolyze carbohydrates in lignin after the softening step.

Preferably, in each acid treatment stage of the invention a suitable combination of temperature, retention time and pH level is selected. The selected combination varies based on acid washing or acid hydrolysis. The process conditions are selected such that lignin does not alternate into carbon or char during the acid treatment.

Preferably, long retention time is used in the acid treatment according to the invention. In one embodiment the retention time is over 1 hour. In one embodiment the retention time is over 4 hours, preferably over 6 hours, and more preferable over 8 hours. In one embodiment the retention time is over 16 hours.

In this context, retention time means time of the treatment stage. The retention time does not include a filtration time.

In one embodiment the temperature is over 60° C. during the treatment stage. In one embodiment the temperature is over 70° C., preferably over 72° C., more preferable over 73° C., and most preferable over 75° C.

In a preferred embodiment pH level is sufficient low during the treatment stage. In one embodiment the pH level is under 3.5, preferable between 2-3. In one embodiment the pH level is under 2.0, preferably between 0.5-1.5. In one embodiment the pH level which is between 2-4 can be used.

In one embodiment the pH level is between 0.5-4.0, preferably 0.8-1.5, the temperature is between 80-130° C., preferably 80-105° C., and the retention time is between 2-60 hours, preferably 6-30 hours, at the at least one acid treatment stage, e.g. at the acid hydrolysis stage. Temperature is below glass transition point of lignin.

In one embodiment the pH is between 2.5-3.5, temperature is between 65-80° C., preferably between 70-80° C. and more preferable about 70° C., and retention time is over 1 hour at the acid washing stage. Increasing temperature and/or retention time and/or decreasing pH level dry solid content and filterability may be improved.

In one embodiment the lignin material is treated in the at least one acid treatment stage and the at least one acid treatment stage is optimized by means of process parameters selected from retention time, temperature, pH level, mixing, oxidizing and their combinations. In one embodiment combination of selected process parameters is optimized in the at least one acid treatment stage. In one embodiment combination of selected process parameters is optimized in each acid treatment stage.

In one embodiment the acid treatment stage is adjusted by means of process parameters in order to increase low molecular weight lignin fragments. If harsh reaction conditions, e.g. temperature over 70° C., retention time over 8 hours and pH level between 1-1.5, is applied in the acid hydrolysis then low molecular weight lignin can be obtained with improved yield.

In one embodiment, when the pre-treatment is made before the acid treatment so in the pre-treatment retention time is below 2 hours, temperature is between 55-70° C. and pH is between 9-10.5. In one embodiment, when the pre-treatment is made before the acid treatment so in the pre-treatment retention time is below 2 hours, temperature is between 55-75° C. and pH is between 9-10, and in the acid treatment retention time is over 8 hours, temperature is between 70-80° C. and pH is below 3.5. In an alternative embodiment, when the pre-treatment is made before the acid treatment so in the pre-treatment retention time is over 8 hours, temperature is between 60-75° C. and pH is between 9-10, and in the acid treatment retention time is below 2 hours, temperature is between 65-80° C. and pH is below 3.5.

It is important for the invention that long retention time is used at least in one stage. Alternatively, the long retention time can be used in more than one stage. The long retention time can be used at the acid treatment stage, e.g. in the acid washing and/or in the acid hydrolysis, and/or in the pre-treatment step.

In one embodiment the formed lignin component (3) is filtrated at the filtration stage (4a,4b) after at least the latest acid treatment stage (2a,2b). In one embodiment the formed lignin component is filtrated after each of the at least one acid treatment stages.

In this context, the filtration refers to any filtration method which can be used in the filtration of the lignin. Preferably, in the filtration the lignin component is washed by water and pressed and optionally air-dried. The filtration can be performed by any suitable filtration device. In one embodiment the formed lignin component is filtrated by pressure filtration or vacuum filtration. In one embodiment pressure is between 10-20 bar, preferably 13-17 bar and more preferable about 15 bar in the pressure filtration.

Preferably improved filterability, especially better filtration rate, achieved by means of the optimization leads to smaller pressure requirement in the filtration and to shorter filtration time. Then cheaper filters, e.g. based on size and type of device, may be used.

In one embodiment the pH level is adjusted just before the filtration, especially if shorter retention time is used in the acid treatment stage.

In one embodiment temperature is over 50° C. and pH is between 2 to 4 during the filtration.

In one embodiment the lignin material is treated in the at least one acid treatment stage such that dry solids content of the lignin component can be increased over 5%, preferably 5-15%, more preferable about 10-15%, as compared with standard lignin component formed by a known acid washing method. In one embodiment dry solids content of the lignin component is over 60%, preferably over 70%, more preferable between 70-90% and most preferable between 70-80%.

In one embodiment the lignin material is treated in the at least one acid treatment stage such that carbohydrates content of the lignin component is under 1.0%, preferably under 0.5%, more preferable under 0.2% and most preferable under 0.1%.

In one embodiment the lignin material is treated in the at least one acid treatment stage such that ash content of the lignin component is under 1.0%, preferably under 0.5%, more preferable under 0.2% and most preferable under 0.1%.

In one embodiment proportion of lignin dissolved during the at least one acid treatment stage is adjusted by means of process parameters selected from retention time, temperature, pH level, mixing efficiency, mixer type, oxidation and their combinations. Then low molecular weight lignin component can be achieved. In one embodiment proportion of lignin dissolved is adjusted during the acid hydrolysis stage.

In one embodiment the additional oxidation is made after the filtration in which an acidic filtrate is additionally oxidized.

In one embodiment the lignin component is additionally oxidized during the acid treatment stage, e.g. at the acid hydrolysis stage. The additional oxidation may be performed by means of air, oxygen, other oxidizing agent or their combinations in order to stabilize structure of the lignin component, to increase purity of lignin and to remove odour.

The lignin component (3) obtainable by the method of the present invention can be used as component in manufacturing a final product selected from activated carbon, carbon fiber, lignin composite, e.g. lignin-plastic composite or lignin-fiber composite, binder material, phenolic component, dispersion agent and their combinations.

The final product or product comprises the lignin component of the present invention. Preferably, pure lignin component according to the present invention is needed in the manufacturing of the activated carbon and carbon fibers.

The method according to the present invention provides the lignin component with good quality. When improving the purify and increasing dry solids content of the lignin component so then it may be provided better properties of the lignin component and the final product.

The present invention provides an industrially applicable, simple and affordable way of making the lignin component from the lignin material. The method according to the present invention is easy and simple to realize as a production process. The method according to the present invention is suitable for use in the manufacture of the different lignin components from different lignin materials.

The invention is described in more detail by the following examples 1-6 with reference to accompanying FIGS. 1-4 and 5*a-d*.

Example 1

In this example and in FIG. 1, a lignin component (3) is formed by an acid treatment.

A starting lignin material (1), which is flash precipitated lignin, is treated by two acid treatment stages (2a, 2b). The first stage (2a) is an acid washing stage and the second stage (2b) is an acid hydrolysis stage. Process conditions are following at the first stage: temperature about 70° C., retention time over 1 hour and pH level about 3. The acid washing is performed with $H_2SO_4$. Process conditions are following at the second stage: temperature over 70° C., retention time over 8 hours and pH level between 1-1.5. The acid treating in hydrolysis is performed with $H_2SO_4$.

The lignin component (3) is filtrated after each acid treatment stage (2a,2b) by pressure filtration (4a,4b). Temperature is over 50° C. and pH is about 2 to 4 during the filtration.

The lignin component can be additionally oxidized during the acid treatment stage.

In these tests it was discovered that it may be produced the lignin component with excellent properties. The formed lignin component has low ash and carbohydrates contents. It was discovered that the ash content can be reduced during the first stage. Further, the ash content can be still reduced during the second stage. It was discovered that the carbohydrates content can be mainly reduced during the second stage but a part of carbohydrates can be reduced during the first stage. By means of high temperature, long retention time and low pH lignin is softened. After softening, acid is able to hydrolyze carbohydrates and oxidize accessible part of lignin into soluble compounds. Carbohydrates may be removed during the acid treatment.

Further, it was discovered that dry solids content of the final lignin component cake can be increased and filterability can be enhanced already at the first stage. Dry solids content of the lignin component can be increased over 5° as compared with standard lignin component. The lignin component has ash content below 0.1% and carbohydrates content below 0.2%. Further, at least part of inorganic sulphure was removed at the acid hydrolysis stage. Further, by means of acid hydrolysis may be increased glass transition temperature of lignin and/or decomposition temperature of lignin.

Further, it is discovered that lignin structure in the cake of the lignin component was in the form of big-single particles. This explains good filterability and high dry solids content.

Further, in these tests it was discovered that the special good optimization results were achieved by two stages process.

Example 2

In this example and in FIG. 2 a lignin component (3) is formed by an acid treatment.

A starting lignin material (1) is treated by one acid treatment stage which is an acid washing stage (2a). Process conditions are following: temperature is about 70° C., retention time over 1 hour and pH level is about 3. The acid washing is performed with $H_2SO_4$.

The lignin component (3) is filtrated after acid washing by pressure filtration (4a). Temperature is over 50° C. and pH is about 2 to 4 during the filtration.

In these tests it was discovered that the formed lignin component has low ash content but carbohydrates content has not decreased, such as in example 1. It was discovered that the ash content can be reduced during the acid washing.

Example 3

In this example and in FIG. 3, a lignin component (3) is formed by an acid treatment.

A starting lignin material (1) is treated by one acid treatment stage which is an acid hydrolysis (2b). Process conditions are following: temperature over 70° C., retention time over 8 hours and pH level between 1-1.5.

The lignin component (3) is filtrated after acid hydrolysis by pressure filtration (4b). Temperature is over 50° C. during the filtration.

In these tests it was discovered that it may be produced the lignin component with good properties. The formed lignin component has low ash and carbohydrates contents. It was discovered that the ash content and carbohydrates content can be reduced during the acid hydrolysis.

Example 4

In this example and FIG. 4, a lignin component (3) is formed by an acid treatment.

A starting lignin material (1) is treated firstly at a pre-treatment stage (5) in which is made a re-slurry step, and secondly at an acid washing stage (2a) in order to produce a lignin component. After the acid washing the lignin component is filtrated (4a).

In the tests 1-4 the pre-treatment is carried out so that short retention time and high pH are used. Then, in the acid washing long retention time and low pH are used.

In the tests 5 and 6 the pre-treatment is carried out so that long retention time and high pH are used. In the acid washing shorter retention time and low pH, about 2.5, are used. It was discovered that during the pre-treatment of tests 5 and 6 softening and particle growth of the lignin is happened thanks to long retention time. Therefore, shorter retention time is sufficient in the acid washing.

Process conditions are described in table 1.

TABLE 1

| Test | T5, ° C. | t5, h | T2a, ° C. | t2a, h | Tfilt, ° C. | pH during long retention | Average cake dry matter, % |
|---|---|---|---|---|---|---|---|
| 1 | 60 | 1 | 60 | 10 | 60 | 2.5 | 46.6 |
| 2 | 65 | 1 | 77 | 13 | 69 | 2.5 | 77.4 |
| 3 | 65 | 1 | 74 | 13 | 73 | 2.5 | 70.1 |
| 4 | 65 | 1 | 78 | 13 | 81 | 2.5 | 74.5 |
| 5 | 73 | 17 | 80 | 1 | 80 | 9.5 | 72.7 |
| 6 | 65 | 13 | 73 | 1 | 75 | 9.5 | 63.6 | in which T5 is temperature of the pre-treatment
t5 is retention time of the pre-treatment
T2a is temperature of the acid washing
t2a is retention time of the acid washing
Tfilt is temperature of the filtration In these tests it was discovered that it may be produced the lignin component with good cake dry matter. In tests 1-4 it was discovered that the cake dry matter can be increased when the temperature of the acid washing was over 70° C., retention time of the acid washing was long and pH was low, about 2.5.

Further, in tests 5-6 it was discovered that the cake dry matter can be increased when the temperature of the pre-treatment was over 70° C. and retention time of the pre-treatment was long.

It was discovered that it is important for the invention that long retention time and temperature over 70° C. are used in at least one acid treatment stage.

Figure 5A:
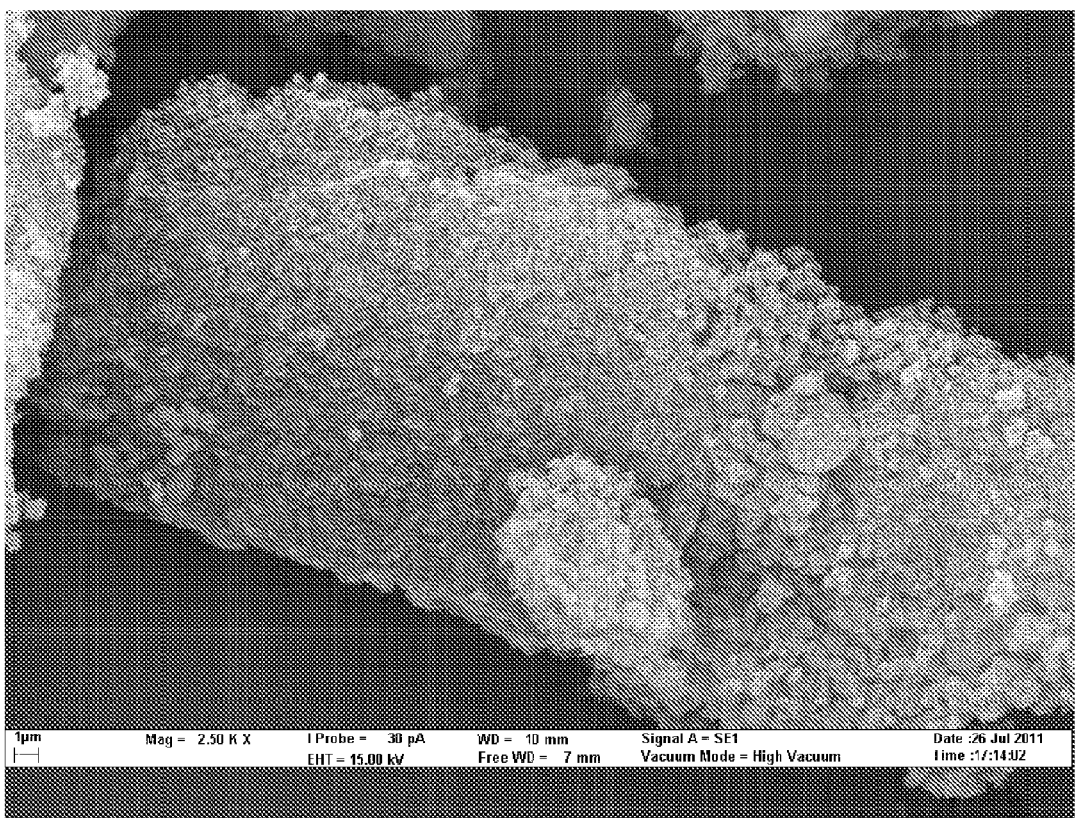
FIGS. 5a and 5d show lignin structures in cakes of comparative lignin components.
Figure 5B:
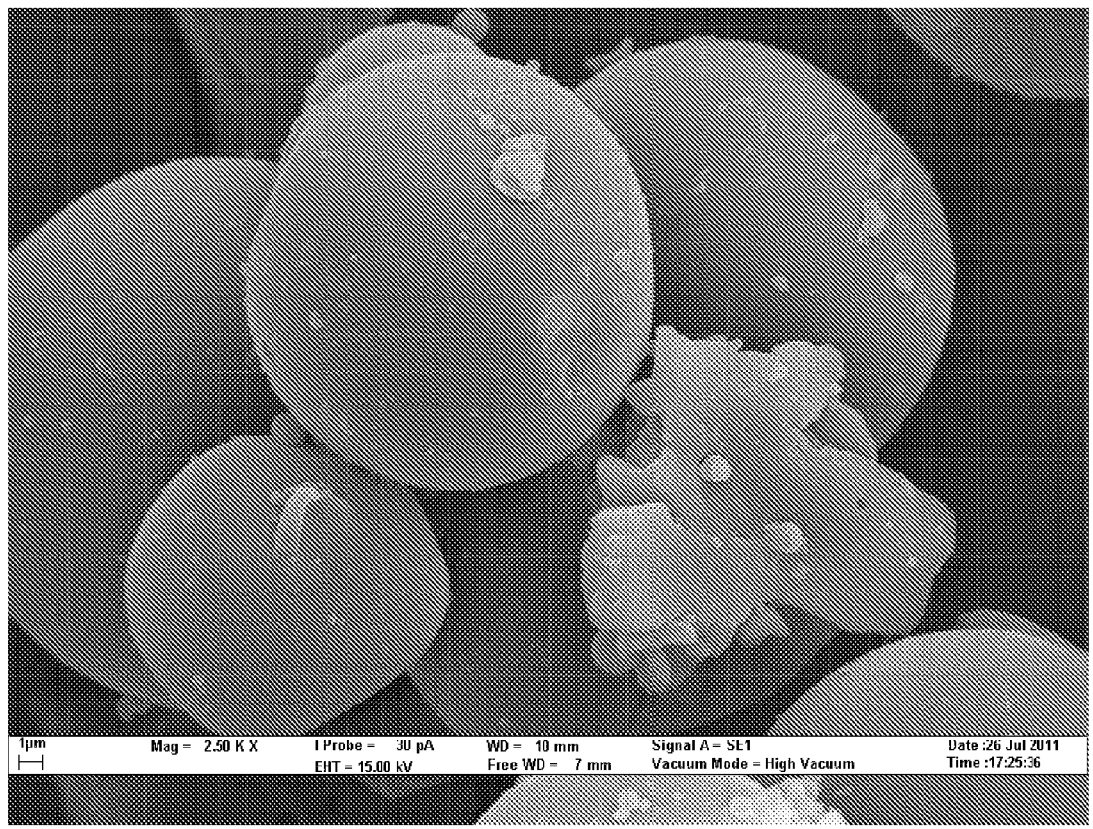
FIGS. 5b and 5c show lignin structures in cakes of lignin components according to the present invention.
Figure 5C:
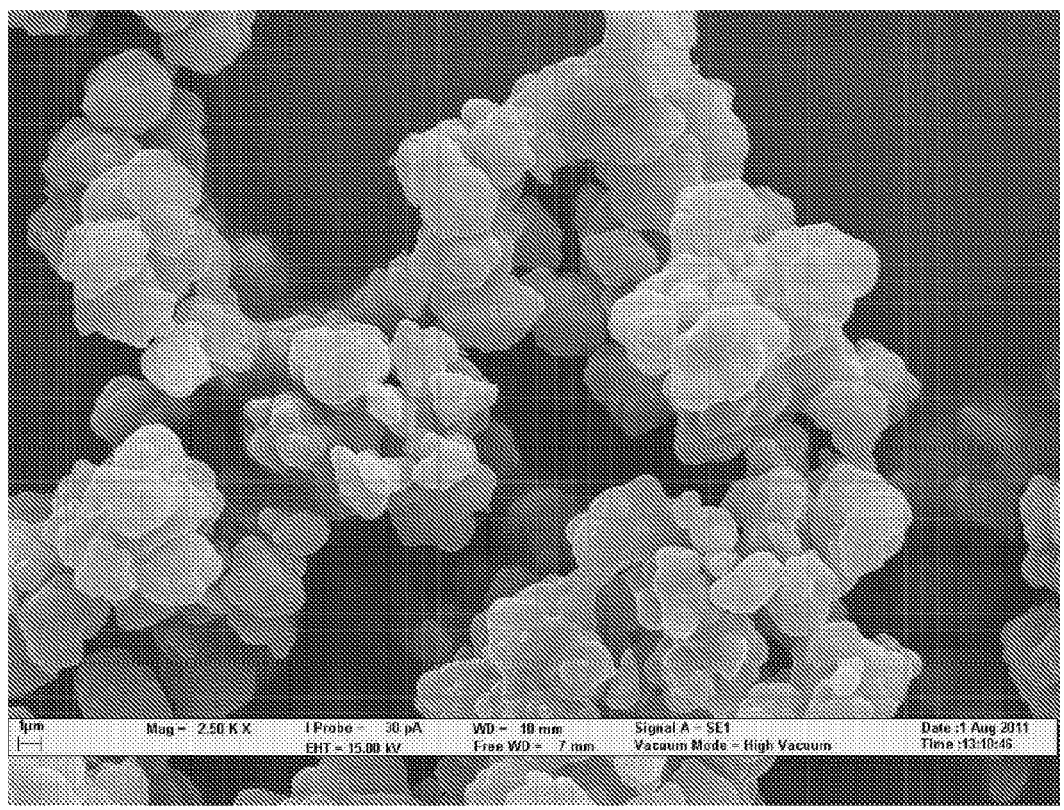
Figure 5D:
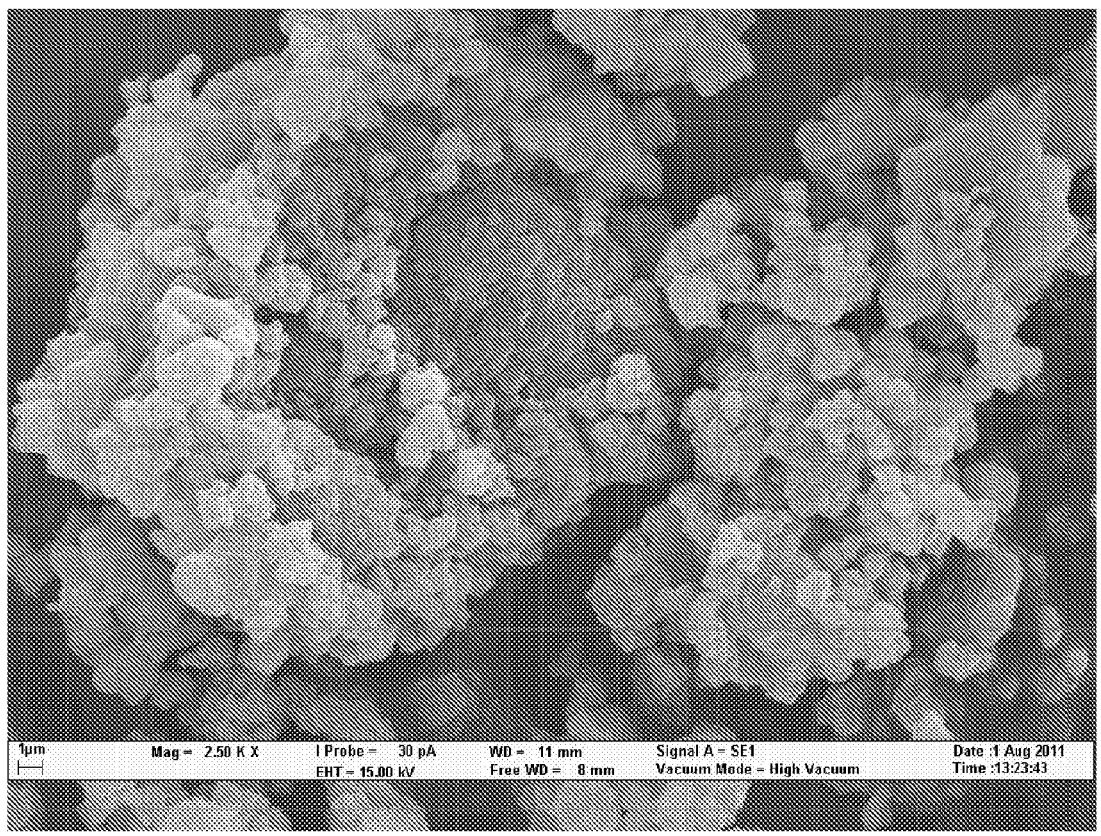

Two lignin components of the present invention have been shown in FIGS. 5b (Test 2) and 5c (Test 5) (SEM images). By way of comparison FIGS. 5a (Test 1) and 5d (Test 6) (SEM images) show structures of comparative lignin components. Improvements in filterability and cake dry matter between Test 1 and Test 6 is mainly due to enhanced agglomeration. Improvement in cake dry matter between Test 6 and Tests 2-5 is due to softening of lignin and re-structure into bigger single particles.

Example 5

In this example and FIG. 2, a lignin component (3) is formed by an acid treatment.

A starting lignin material (1) is re-slurried, and after then the lignin is treated at an acid treatment stage (2a) in order to produce a lignin component. After the acid treatment the lignin component is filtrated (4a).

Delay between the re-slurry and the acid treatment is about 1 hour and temperature is about 60-65° C.

Process conditions of the acid treatment are described in table 2. In the tests 3-4 the acid treatment is carried out so that long retention time and low pH are used. Tests 1 and 2 are comparative tests. In test 1 low temperature and short retention time are used. In test 2 low temperature and long retention time are used.

TABLE 2

| Test | T2a, ° C. | t2a, h | Tfilt, ° C. | pH | Average cake dry matter, % |
|---|---|---|---|---|---|
| 1 | 60 | 1 | 60 | 2.5 | 41.5 |
| 2 | 60 | 10 | 60 | 2.5 | 47.5 |
| 3 | 77 | 13 | 69 | 2.5 | 75.8 |
| 4 | 74 | 13 | 73 | 2.5 | 71.5 | in which T2a is temperature of the acid treatment t2a is retention time of the acid treatment Tfilt is temperature of the filtration In these tests it was discovered that it may be produced the lignin component with good cake dry matter. In tests 1-4 it was discovered that the cake dry matter can be increased when the temperature of the acid treatment was over 70° C., retention time of the acid treatment was long and pH was low, about 2.5.

Example 6

In this example and FIG. 1, a lignin component (3) is formed by two stage acid treatment.

A starting lignin material (1) is re-slurried, and after that the lignin is treated at two-stage acid treatment (2a, 2b) in order to produce a lignin component. The first acid treatment stage in this example is test 5 in Table 1. The first stage is an acid washing and the second stage is an acid hydrolysis. After each acid treatment stages the lignin component is filtrated (4a, 4b).

Lignin cake from the acid washing stage was re-slurried for 1 hour at 60-70° C. The pH of the lignin slurry was adjusted just before the acid hydrolysis stage.

Process conditions of the acid hydrolysis are described in table 3.

TABLE 3

| Test | T2b, ° C. | t2b, h | pH | 700° C. ash of lignin, % dry | Carbo-hydrates, % dry | Mw, g/mol | Acid used, kg/t lignin |
|---|---|---|---|---|---|---|---|
| 1 | 120 | 1 | 3.6 | 0.01 | 0.37 | 5190 | 0 |
| 2 | 80 | 1 | 2.0 | 0.06 | 0.60 | 4180 | 13 |
| 3 | 95 | 1 | 1.5 | 0.06 | 0.42 | 4290 | 25 |
| 4 | 95 | 4 | 1.5 | 0.09 | 0.19 | 4570 | |
| 5 | 105 | 16 | 1.5 | 0.05 | <0.02 | 5620 | |
| 6 | 80 | 4 | 1.0 | 0.13 | 0.25 | 4340 | 150 |
| 7 | 80 | 17 | 1.0 | 0.09 | 0.09 | 4600 | |
| 8 | 80 | 2 | 0.5 | 0.05 | 0.29 | 4880 | 540 | in which T2b is temperature of the acid hydrolysis t2b is retention time of the acid hydrolysis Tfilt is temperature of the filtration Test 9 with T2b of 140° C., t2b of 1 hour and pH of 3.5 resulted in the formation of char, which adhered to reactor walls.

In these tests of examples 1-6 it was discovered that it may be produced the lignin component with good ash content and carbohydrates content. Starting lignin material for the hydrolysis tests, so Test 5 in Table 1 had carbohydrates content of 0.73%. In tests it was discovered that the ash and carbohydrates content can be decreased when the temperature of the acid hydrolysis was high, over 75° C., retention time of the acid hydrolysis was long and pH was low. Long retention time in the acid washing stage shortens the time needed in the acid hydrolysis stage. Molecular weight of the lignin after the acid hydrolysis reveals that extensive condensation was not encountered. The consumption of sulphuric acid increases rapidly when pH is below 1.

Figure 6:
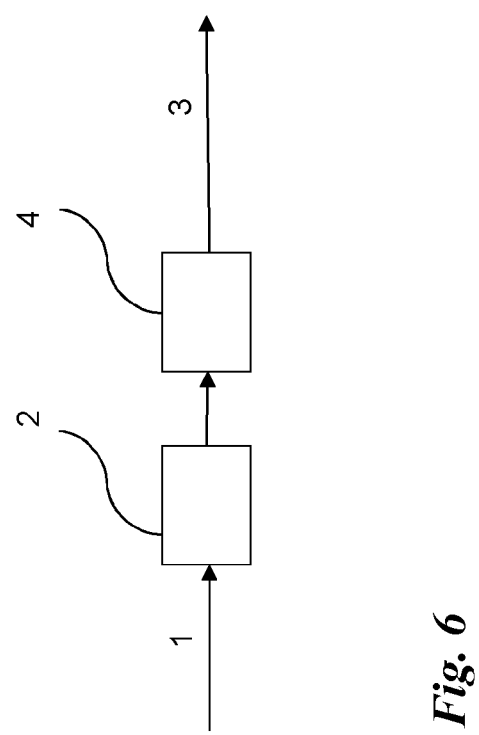
FIG. 6 is a flow chart illustration of a method according to one embodiment of the present invention.
Figure 7:
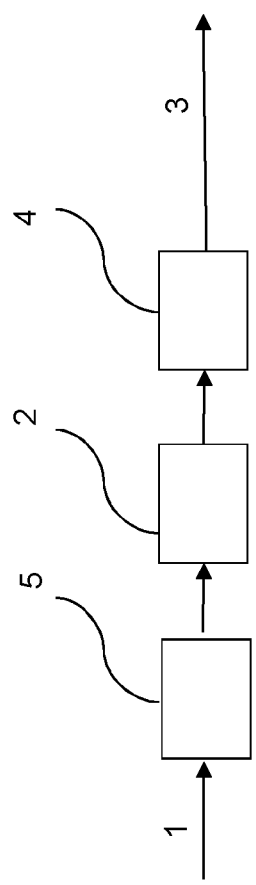
FIG. 7 is a flow chart illustration of a method according to another embodiment of the present invention.
Figure 8:
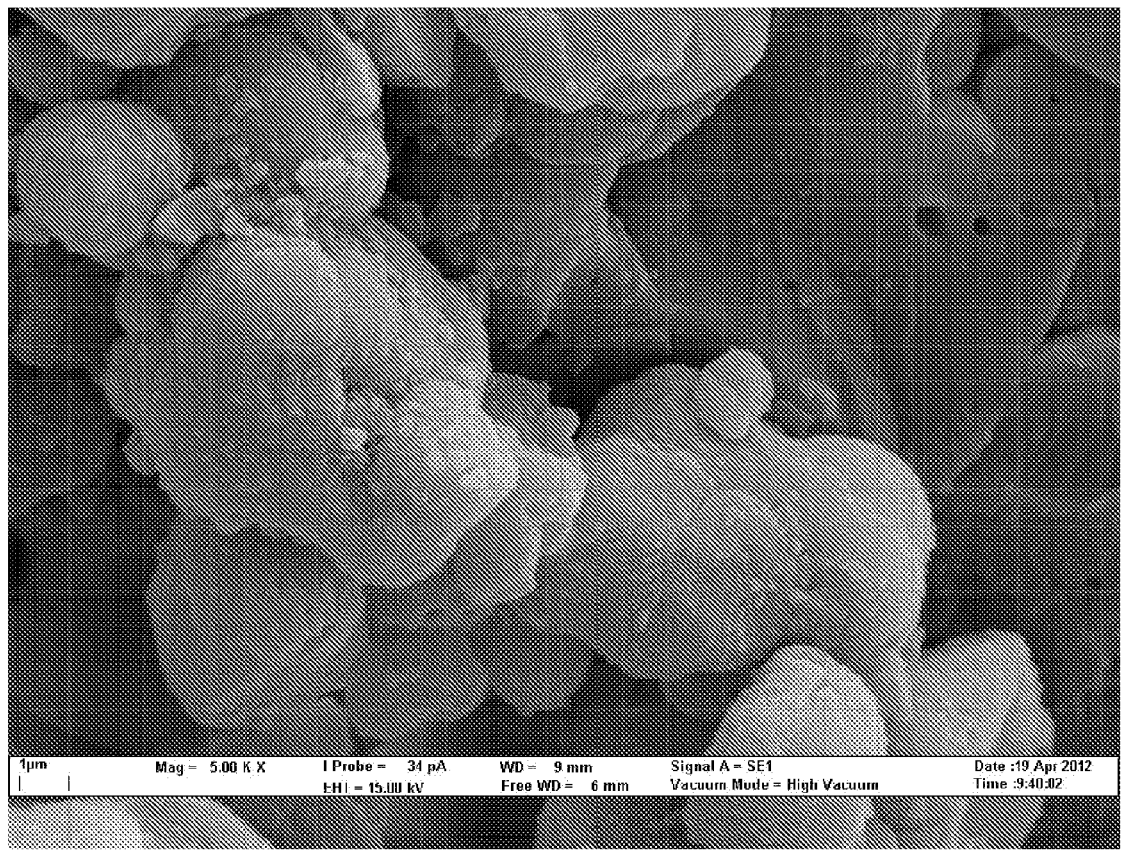
FIG. 8 shows a SEM-picture of lignin structure in cake of one lignin component according to the present invention.

One embodiment of the method of the present invention is shown in FIG. 6. Another embodiment of the method of the present invention is shown in FIG. 7. A structure of one lignin component is shown in FIG. 8.

The invention relates to optimization of acid treating in lignin separation process. In the method of the present invention a lignin component is formed from a lignin material by an acid treatment, the method comprising: forming a lignin component (3) of lignin material (1) by treating the lignin material in an acid treatment stage (2) by means of an acid composition; and optimizing process conditions in the acid treatment stage (2) so that high temperature over 70° C., long retention time, such as delay time, over 6 hours and pH level between 4.5-7 are used during the acid treatment in order to remove undesired substance from the lignin component and to purify the lignin component and to reduce acid consumption in the acid treating of lignin.

In a preferred embodiment the lignin material (1) is treated by an acid washing (2) to form a lignin component (3). The lignin material (1) is treated in an acid washing stage (2). Long retention time over 6 hours, high temperature over 70° C., and pH level between 4.5 and 7 are used in the acid washing.

The invention is specially based on improving properties of the lignin component. When the lignin material is acid treated by optimizing process conditions and parameters, e.g. retention time and temperature, then higher pH level, e.g. 4.5-7 instead of about 2.5, can be used, and then the properties, such as purity, dry solids content and filterability of the lignin component are good. Further, acid such as virgin acid consumption can be decreased. Preferably, destabilisation of lignin happens before the filtration thanks to high temperature and long retention time in the acid treatment. Further, odour in the lignin component can be decreased. Then it is provided the lignin component which is suitable to use in typical and special applications.

In this context, a lignin material refers any material or composition containing lignin. The lignin material may contain one or more material components. In one embodiment suitable and desired additives can be added into the lignin material to form a desired lignin component.

In one embodiment the lignin material includes material which is selected from a group consisting of lignin from alkaline pulping process, kraft lignin, lignin from soda process, lignin coming from a process in which lignin is separated the raw material by a solution including suitable chemicals and their combinations.

In one embodiment the lignin material includes flash precipitated lignin. In one embodiment flash precipitated lignin is obtained after $CO_2$-precipitation. Preferably, flash precipitated lignin is formed as disclosed in patent application PCT/FI2011/050896.

In one embodiment the lignin is precipitated from the black liquor by a continuous process with $CO_2$ at 6-10 bar overpressure. In one embodiment the lignin is separated by a flash precipitation lignin separation method, such as disclosed in patent application PCT/FI2011/050896. In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The residence time in the above method is under 300 s. The flash precipitated lignin particles, having a particle diameter of less than 2 μm, form agglomerates, which can be separated from black liquor using e.g. filtration. The flash precipitated lignin can be purified and/or activated if needed for the further processing. The flash precipitated lignin has many advantages, e.g. activity, dispersability, solubility, drainability and preservability. In one embodiment of the present invention, the lignin component is a flash precipitated kraft lignin. Preferably, the flash precipitated kraft lignin is undrained. Therefore the lignin has higher activity, and the lignin can be re-dissolved. The lignin needs only a very simple re-dispersing stage when it is added e.g. into an adhesive mixture. Also control of the amount of water in the lignin based composition is easier when the re-dispersing is easier. Further, the lignin is easier to handle in the process because the lignin is not dusty. Preferably, the flash precipitated kraft lignin has dry matter content of 50-80%.

In one embodiment the lignin material is treated chemically and/or mechanically before the acid treatment stage of the present invention. In one embodiment the lignin material is precipitated before the acid treatment stage. In one embodiment the lignin material is re-slurried before the acid treatment.

In this context, a lignin component means product formed from lignin material in one or more stages. Term "lignin component" is already used after the first treatment stage.

In this context, the acid washing refers to any acid washing method. In one embodiment the acid washing is performed with an acid composition containing sulphuric acid ($H_2SO_4$), other acid or other suitable acidifying chemical or their combination. The optimization of the process affects positively consumption of $H_2SO_4$ or other acid or other acidifying chemical.

In one embodiment the acid composition contains sulphuric acid, which can be virgin acid or recycled acid. Without any process improvements according to the invention consumption of sulphuric acid is rather high. Sulphuric acid is cheap, but high amount of sodium hydroxide is needed to fulfil Na/S balance of pulp mill. Furthermore, all extra sulphur added to process must be dumped from recovery boiler meaning extra cost.

In a preferred embodiment the acid composition contains other acid or other acidifying chemical containing salt. Salt can be selected from group K-, Na-, Mg-, Al-, Ca-salt or other suitable salt. In one embodiment the acid composition contains sulphate compound with salt. In one embodiment the acid composition contains sodium sesquisulphate. Sodium sesquisulphate (SSS) is a waste fraction from chlorine dioxide plant in pulp mill. In one embodiment waste acid is used as other acid or other acidifying chemical.

Preferably the acid composition contains sulphuric acid, and other acid or other acidifying chemical with salt. In one embodiment the acid composition contains sulphuric acid and sodium sesquisulphate. In one embodiment the acid composition contains sulphuric acid about 10-90 w-%, in one embodiment 60-70 w-%, and sodium sesquisulphate about 10-90 w-%, in one embodiment 30-40 w-%. The high pH saves acid or other acidifying chemical containing salt which is good for the pulp mill and brings less salt to process, and then less water is needed for washing.

Preferably, in the acid treatment stage of the invention a suitable combination of temperature, retention time and pH level is selected. The selected combination varies based on acid washing method, lignin material, acid composition and desired product.

Preferably, long retention time is used in the acid treatment according to the invention. In one embodiment the retention time is over 6 hours, preferably over 10 hours, and more preferable between 10 and 20 hours.

In this context, retention time means time of the treatment stage. The retention time does not include a filtration time.

In one embodiment the temperature is over 80° C. during the acid treatment stage, preferably over 85° C., and more preferable between 80-90° C.

In a preferred embodiment pH level is sufficient high during the acid treatment stage. In one embodiment the pH level is over 4.5, preferable over 5. In one embodiment the pH level is under 7, preferably under 6. In a preferred embodiment the pH level which is between 5 and 6 can be used. When high pH is used according to the invention, so it leads to non-corrosive lignin as a product. Then stainless steel instead of more expensive acid-proof steel can be used in the process devices.

In one embodiment the pH level is between about 4.5-7, preferably about 5-6, the temperature is between 70-100° C., preferably 80-90° C., and the retention time is over 1 hour, preferably 6-30 hours and more preferable between 10 and 20 hours, at the acid treatment stage.

Increasing temperature and/or retention time and/or pH level dry solid content and filterability may be improved. Improved dry solid content of filter cake leads to lower energy consumption in drying and to lower consumption of water in washing to reach same purity. Also dryer can be smaller, which leads to savings in investment. Savings in water consumption is important, since likely washing water must be circulated back to evaporation plant. Also certain dry solid content is needed to maintain processability of lignin cakes. For applications requiring no drying, for example burning, the low content of water in filter cake is a benefit.

In the present invention it has been noticed that use of high temperature and long delay time combined with high pH, e.g. 5-7, and use of sodium sesquisulphate can reduce acid consumption even by about 65%, which means acid consumption of about 70 kg/t lignin. In the process of the invention normal cake washing with water after the acid treatment is enough to raise or keep pH of final lignin to between 5 and 7.5, preferably 6-7. Then lignin is non-corrosive. Production of neutral lignin is necessity for most applications. If lignin has pH of 2.5, so an additional process stage is needed to neutralize lignin.

The method of the invention can be used in connection with any acid treatment process containing one or more acid treatment stages. In one embodiment the acid treatment process comprises acid hydrolysis stage before or after the acid washing stage.

The method of the invention can be used in connection with the acid treatment process described in patent application FI20116253.

In one embodiment the method of the present invention comprises a pre-treatment step (5) before the acid treatment stage (2). In one embodiment the lignin material is re-slurried in the pre-treatment step. In a preferred embodiment the pre-treatment step is a softening step of lignin in which the lignin is softened and structure of the lignin is modified.

In one embodiment, when the pre-treatment (5) is made before the acid treatment so in the pre-treatment retention time is below 2 hours, temperature is between 55-70° C. and pH is between 9 and 10.5.

It is important for the invention that long retention time is used at the acid treatment. Alternatively, the long retention time can be used also in other stage such as in the pre-treatment stage. The long retention time can be used in the acid washing and/or in the pre-treatment step.

In one embodiment the formed lignin component (3) is filtrated at the filtration stage (4) after the acid treatment stage (2).

In this context, the filtration refers to any filtration method which can be used in the filtration of the lignin. Preferably, in the filtration the lignin component is washed by water and pressed and optionally air-dried. The filtration can be performed by any suitable filtration device. In one embodiment the formed lignin component is filtrated by pressure filtration or vacuum filtration. In one embodiment pressure is between 10-20 bar, preferably 13-17 bar and more preferable about 15 bar in the pressure filtration.

Preferably improved filterability, especially better filtration rate, achieved by means of the invention leads to smaller pressure requirement in the filtration and to shorter filtration time. Then cheaper filters, e.g. based on size and type of device, may be used.

In one embodiment temperature is over 50° C. and pH is between 5 and 7 during the filtration. In one embodiment the pH level is re-adjusted just before the filtration.

In one embodiment the process comprises at least two filtration stages. In one embodiment there is one filtration stage after each acid treatment stage. In one embodiment there is the first filtration stage before the acid washing of the invention and the second filtration stage after the acid washing of the invention. In the first filtration stage the lignin material or lignin component washed is filtrated at pH about 10, and then sulphuric acid can be saved in the acid washing.

In one embodiment the additional oxidation is made after the filtration in which an acidic filtrate is additionally oxidized. In one embodiment the lignin component is additionally oxidized during the acid treatment stage. The additional oxidation may be performed by means of air, oxygen, other oxidizing agent or their combinations in order to stabilize structure of the lignin component, to increase purity of lignin and to remove odour.

The lignin component (3) obtainable by the method of the present invention can be used as component in manufacturing a final product selected from activated carbon, carbon fiber, lignin composite, e.g. lignin-plastic composite or lignin-fiber composite, binder material, phenolic component, dispersion agent and their combinations.

The final product or product comprises the lignin component of the present invention. Preferably, pure lignin component according to the present invention is needed in the manufacturing of the activated carbon and carbon fibers.

The method according to the present invention provides the lignin component with good quality. When improving the purify and increasing dry solids content of the lignin component so then it may be provided better properties of the lignin product and the final product.

The present invention provides an industrially applicable, simple and affordable way of making the lignin component from the lignin material. The method according to the present invention is easy and simple to realize as a production process. The method according to the present invention is suitable for use in the manufacture of the different lignin components from different lignin materials.

Further, the invention is described in more detail by the following examples 7-8 with reference to accompanying FIGS. 6-8.

Example 7

In this example and in FIG. 6, a lignin component (3) is formed by an acid treatment on a laboratory scale.

A starting lignin material (1), which was flash precipitated lignin, was re-slurried and treated by an acid washing stage (2). Process conditions were following at the acid washing stage: temperature about 87° C., retention time about 12 hours and pH level about 5.6. The acid washing was performed with an acid composition containing $H_2SO_4$ and sodium sesquisulphate (SSS) so that mixture of $H_2SO_4$:SSS was 1:6. SSS was 20% liquid.

The lignin component (3) was filtrated after the acid washing stage (2) by pressure filtration (4). Temperature was about 82° C. and pH was 6.5-7 during the filtration. Filtration rate was about 207 kg/m$^3$/h. Dry solids content of filter cake was about 78%.

In these tests it was discovered that it may be produced the lignin component with good properties. It was discovered that dry solids content of the final lignin component cake and filterability and filtration rate time needed were in good level. Further, sulphuric acid can be saved by means of the invention.

Further, it was discovered that lignin structure in the cake of the lignin component was in the form of big-single particles. This explains good filterability and high dry solids content.

Example 8

In this example a lignin component (3) is formed by an acid washing according to FIG. 6 on a pilot scale.

A starting lignin material (1), which was flash precipitated lignin, was slurred and was treated at an acid washing stage (2) by an acid composition in order to produce a lignin component. The acid washing was performed with an acid composition containing $H_2SO_4$ and sodium sesquisulphate (SSS) so that mixture of $H_2SO_4$:SSS was 1:6.

The lignin component (3) was filtrated after the acid washing stage (2) by pressure filtration (4). Temperature was about 82° C. and pH was 6.5-7 during the filtration.

Process conditions are described in table 4.

TABLE 4

| Test | T1, ° C. | t1, h | ph during acid washing | pH during filtration |
| --- | --- | --- | --- | --- |
| 1 | 86 | 15 | 10 | 5.3 |
| 2 | 87 | 12 | 5.5 | 5.7 |
| 3 | 81 | 15 | 5.6 | 5.9 |
| 4 | 82 | 14 | 5.6 | 5.8 |
| 5 | 83 | 13 | 5.4 | 5.7 |
| 6 | 83 | 15 | 5.3 | 5.6 | in which T1 is temperature of the acid washing
t1 is retention time of the acid washing
Process results are described in table 5.

TABLE 5

| Test | Filtrate dry matter, % | Filtration rate, kg DS/m²h | Washing water, m³/t lignin | Ash of lignin (700° C.) | Lignin cake dry solids, % |
| --- | --- | --- | --- | --- | --- |
| 1 | 12 | 31 | 3.9 | 2.9 | 51.9 |
| 2 | 22 | 310 | 1.1 | 6.2 | 78.0 |
| 3 | 16 | 407 | 2.8 | 3.8 | 65.9 |
| 4 | 16 | 400 | 3.2 | 2.9 | 63.2 |
| 5 | 14 | 239 | 4.0 | 1.7 | 68.4 |
| 6 | 15 | 307 | 3.4 | 3.0 | 62.1 | in which DS is dry solids
Filtration rate is defined during feeding.

In the tests it was surprisingly discovered that filterability of the lignin component was good even though lignin component was treated in high pH level in the acid washing. In the tests it was discovered that to enable practical filtration rate, slurry of the lignin material (1) must stay at pH 5-6 for sufficiently long time, over 6 hours and at sufficiently high temperature, over 70° C., in the acid washing. Further, it was discovered that it may be produced the lignin component with good cake dry solids and quality. Further, it was discovered that high sodium concentration in the acid washing generally improves filtration, but usually raises final ash content in lignin component. However, ash content was at an adequate level.

Further, it was discovered that lignin structure in the cake of the lignin component was in the form of big-single particles. One lignin component of test 2 is shown in FIG. 8, SEM image.

From the all tests of examples 7-8 it was discovered that it is important for the invention that long retention time and high temperature together with high pH level are used in the acid washing stage. Further, it was important that at least part of sulphuric acid is substituted by other acid or other acidifying chemical with salt. Sulphuric acid consumption can be decreased due to high pH level and substitution of sulphuric acid.

Figure 9:
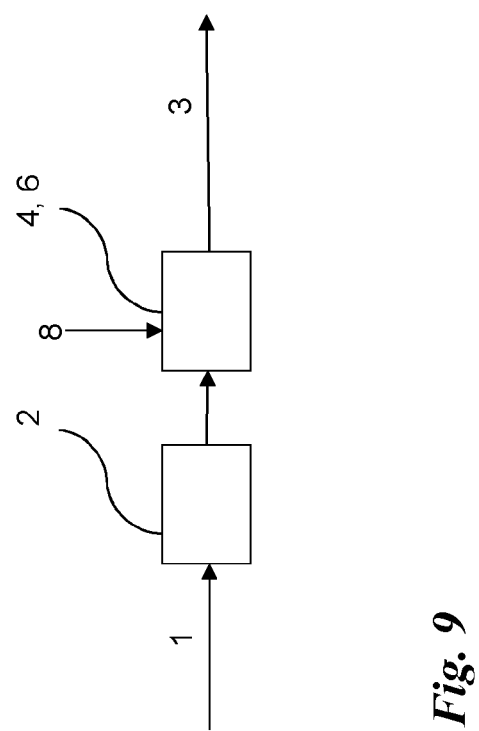
FIG. 9 shows a flow chart illustration of a method according to one embodiment of the present invention.
Figure 10:
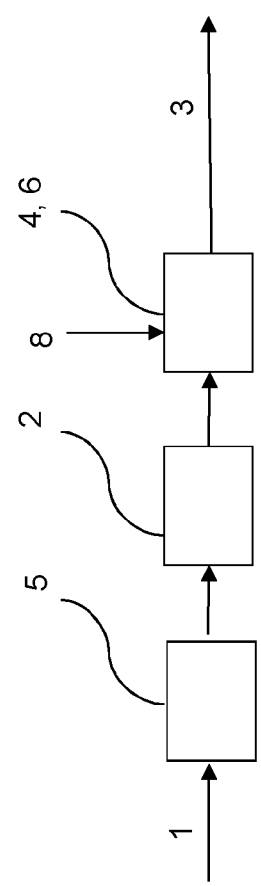
FIG. 10 shows a flow chart illustration of a method according to another embodiment of the present invention.
Figure 11:
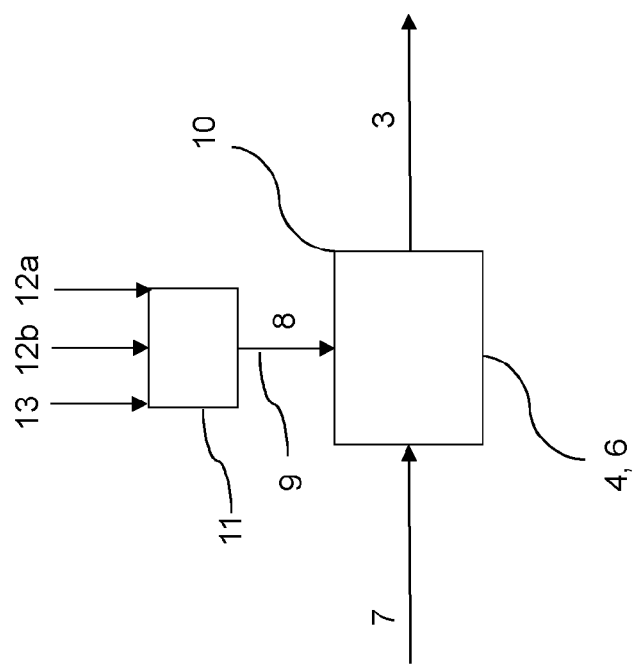
FIG. 11 shows a device according to one embodiment of the present invention.

One embodiment of the method of the present invention is shown in FIG. 9. Another embodiment of the method of the present invention is shown in FIG. 10. One embodiment of the device of the present invention is shown in FIG. 11.

In the method of the present invention a lignin component is made from lignin material (1) by an acid treatment. According to the invention a lignin component (3) is formed of lignin material (1) by treating the lignin material by means of an acid composition in at least one acid treatment stage (2); and the lignin component is washed and neutralized (6) by a pH-buffer during a filtration (4) after the acid treatment, and pH in pH-buffer is between 4-10.

In this context, lignin material refers any material or composition containing lignin. The lignin material may contain one or more material components. In one embodiment suitable and desired additives can be added into the lignin material to form a desired lignin component.

In one embodiment the lignin material includes material which is selected from a group consisting of lignin from alkaline pulping process, kraft lignin, lignin from soda process, lignin coming from a process in which lignin is separated the raw material by a solution including suitable chemicals and their combinations.

In one embodiment the lignin material includes flash precipitated lignin. In one embodiment flash precipitated lignin is obtained after $CO_2$-precipitation. Preferably, flash precipitated lignin is formed as disclosed in patent application PCT/FI2011/050896.

In one embodiment the lignin is precipitated from the black liquor by a continuous process with $CO_2$ at 6-10 bar overpressure. In one embodiment the lignin is separated by a flash precipitation lignin separation method, such as disclosed in patent application PCT/FI2011/050896. In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The residence time in the above method is under 300 s. The flash precipitated lignin particles, having a particle diameter of less than 2 μm, form agglomerates, which can be separated from black liquor using e.g. filtration. The flash precipitated lignin can be purified and/or activated if needed for the further processing. The flash precipitated lignin has many advantages, e.g. activity, dispersability, solubility, drainability and preservability. In one embodiment of the present invention, the lignin component is a flash precipitated kraft lignin. Preferably, the flash precipitated kraft lignin is undrained. Therefore the lignin has higher activity, and the lignin can be re-dissolved. The lignin needs only a very simple re-dispersing stage when it is added e.g. into an adhesive mixture. Also control of the amount of water in the lignin based composition is easier when the re-dispersing is easier. Further, the lignin is easier to handle in the process because the lignin is not dusty. Preferably, the flash precipitated kraft lignin has dry matter content of 50-80%.

In one embodiment the lignin material is treated chemically and/or mechanically before the at least one acid treatment stage of the present invention. In one embodiment the lignin material is precipitated before the at least one acid treatment stage. In one embodiment the lignin material is re-slurried before the at least one acid treatment.

In this context, a lignin component means product formed from lignin material in at one or more stages. Term "lignin component" is already used after the first treatment stage.

In one embodiment the at least one acid treatment stage (2) is selected from a group consisting of acid washing, acid hydrolysis and their combinations. The acid treatment (2) is carried at one stage or alternatively at more than one stage. In one embodiment the at least one acid treatment stage (2) is acid washing. In one embodiment the at least one acid treatment stage (2) is acid hydrolysis. In one embodiment the lignin material (1) is treated at two acid treatment stages (2) in which one of stages is acid washing and one of stages is acid hydrolysis.

In this context, the acid washing refers to any acid washing method. In one embodiment the acid washing is performed with an acid composition containing sulphuric acid ($H_2SO_4$), other acid or other suitable acidifying chemical or their combination. The optimization of the process affects positively consumption of $H_2SO_4$ or other acid or other acidifying chemical.

In this context, the acid hydrolysis refers to any acid hydrolysis method. In one embodiment the acid hydrolysis is performed by means of $H_2SO_4$, or other suitable acidifying chemical, typically in the presence of water.

In one embodiment the acid composition includes $H_2SO_4$ which can be virgin acid or recycled acid. In one embodiment the acid composition includes acidifying chemical.

Preferably, in the acid treatment stage of the invention a suitable combination of temperature, retention time and pH level is selected. The selected combination varies based on acid washing or hydrolysis method, lignin material, acid composition and desired product.

Any acid treatment process can be used in connection with the present invention, for example acid treatment process as disclosed patent application FI20116253 or FI20125703 or other suitable acid treatment method can be used.

In one embodiment a lignin component is made from lignin material (1) by a mild acid treatment so that the lignin material (1) is treated in at least one acid treatment stage (2) and the at least one acid treatment stage is optimized by means of a combination of process parameters comprising retention time, e.g. long retention time, temperature, e.g. high temperature, and pH level, e.g. sufficient low, in order to decrease ash and/or carbohydrates in the lignin component, and preferably in order to remove undesired substance from the lignin component and to purify the lignin component. In one embodiment the lignin component is formed as disclosed in patent application FI 20116253.

In one embodiment the method comprising: optimizing process conditions in the acid treatment stage so that high temperature, long retention time and low pH level are used during the acid treatment.

Preferably, long retention time is used at the acid treatment stage, in at least one acid treatment stage. In this context, retention time means time of the acid treatment stage. The retention time does not include a filtration time.

In one embodiment the retention time which is over 6 hour is used during the acid treatment. Preferably, a lignin component is made from lignin material by an acid treatment, the method comprising: forming a lignin component of lignin material by treating the lignin material in at least one acid treatment stage; and optimizing process conditions by means of a combination of process parameters comprising retention time, temperature and pH level at the acid treatment stage so that the retention time is over 6 hours during at least one acid treatment stage.

In one embodiment the retention time which is over 8 hour is used during the acid treatment. In one embodiment the retention time which is over 10 hour is used during the acid treatment. In one embodiment the retention time which is over 16 hour is used during the acid treatment.

In one embodiment the temperature which is over 70° C. is used during the acid treatment. In one embodiment the temperature is over 72° C., more preferable over 73° C., and most preferable over 75° C.

In one embodiment the pH level which is between 0.5-4 is used during the acid treatment. In a preferred embodiment pH level is sufficient low during the treatment stage. In one embodiment the pH level is under 3.5, preferable between 2-3. In one embodiment the pH level is under 2.0, preferably between 0.5-1.5. In one embodiment the pH level which is between 2-4 can be used.

In one embodiment the method comprises a pre-treatment step before the at least one acid treatment stage. In one embodiment the lignin material is re-slurried in the pre-treatment step. In a preferred embodiment the pre-treatment step is a softening step of lignin in which the lignin is softened and structure of the lignin is modified.

It is important for the invention that long retention time is used at least in one acid treatment stage. Alternatively, the long retention time can be used in more than one stage. The long retention time can be used at the acid treatment stage, e.g. in the acid washing and/or in the acid hydrolysis, and/or in the pre-treatment step.

Increasing retention time and/or temperature dry solid content and filterability may be improved. Improved dry solid content of filter cake leads to lower energy consumption in drying and to lower consumption of washing liquid in washing to reach good purify.

In one embodiment pH in pH-buffer is between 5-9. In one embodiment pH in pH-buffer is between 6-8. In one embodiment pH in pH-buffer is over 4, preferably over 5, and more preferable over 6. In one embodiment pH in pH-buffer is below 10, preferably below 9, and more preferable below 8. Highly alkaline washing liquid, in which pH is higher than 10, increases dissolution of lignin rapidly.

In one embodiment pH-buffer is in the form of solution. The pH-buffer may include one or more than one component. Preferably, the pH-buffer contains at least one buffer agent. In one embodiment the pH-buffer includes buffer agent selected form a group consisting of citrate, acetate, carbonate and their combinations. In one embodiment the pH-buffer includes alkaline based compound, e.g. NaOH. In one embodiment the alkaline based compound is used to adjust pH level in the pH-buffer. In one embodiment the pH-buffer includes citrate as a buffer agent. In one embodiment the pH-buffer includes citrate and alkaline based compounds and water, and pH of the pH-buffer is between 5-7. Alternatively, the pH-buffer can include any suitable buffer agent. In one embodiment the pH-buffer includes water. Composition of the pH-buffer can be optimized by taken into account the requirements of processes and final products.

Preferably, the method of the invention comprises the filtrating (4) of the lignin component after the acid treatment. In one embodiment the formed lignin component (3) is filtrated at the filtration stage (4) after at least the latest acid treatment stage (2).

In this context, the filtration refers to any filtration method which can be used in the filtration of the lignin. Preferably, in the filtration the lignin component is filtrated, washed and pressed and optionally air-dried. The filtration can be performed by any suitable filtration device. In one embodiment the formed lignin component is filtrated by pressure filtration or vacuum filtration. In one embodiment pressure is between 10-20 bar, preferably 13-17 bar and more preferable about 15 bar in the pressure filtration.

The filtration comprises a filtrating step, containing feeding of the lignin component, for forming a filter cake and washing step, such as a cake washing step, for washing the filter cake in order to decrease ash content in the lignin product. Further, the filtration may comprise a pre-pressing step before the washing step and a final pressing step after the washing step.

Preferably, the lignin component is neutralized during the filtration, preferably in connection with the washing step, such as cake washing step. Preferably the washing of the lignin component is made by means of the pH-buffer. Simultaneously, the lignin component is neutralized. The pH-buffer is used instead of clean water when washing the filter cake.

In the present invention the filtration device (10) comprises a lignin feeding equipment for feeding the lignin component (7) from an acid treatment stage into the filtration device, and a filtrating step for forming a cake of the lignin component and a washing step for washing the cake, and a pH-buffer feeding equipment (9) for feeding the pH-buffer (8) into the washing step. In the washing step the lignin component is washed and neutralized by the pH-buffer. Alternatively, the filtration device may comprise a pre-pressing step between the filtration step and the washing step and/or a final pressing step after the washing step. The pH-buffer feeding equipment (9) may contain one or more than one device selected from the group consisting of tank, pipe, pipeline, tube, pump and their combination or the like to feed the pH-buffer into the washing step.

In one embodiment the filtration device (10) comprises at least one feeding tank from which pH-buffer or component of the pH-buffer is fed into the washing step, into the pH-buffer feeding equipment or into a mixing device. In one embodiment the pH-buffer is fed from the feeding tank into the washing step by means of the pH-buffer feeding equipment. In one embodiment the pH-buffer feeding equipment contain at least one feeding tank. In one embodiment the pH-buffer is fed from the feeding tank into the washing step.

In one embodiment the filtration device (10) comprises a mixing device (11). In one embodiment the mixing device contains at least one mixing tank or at least one mixer, e.g. static mixer, in a container or a pipeline in order to form the pH-buffer. The pH-buffer may be formed in the mixing device, e.g. in the mixing tank, by combining components of the pH-buffer together and/or by mixing. The pH-buffer is fed from the mixing device into the washing step by means of the pH-buffer feeding equipment or via the pH-buffer feeding equipment. Alternatively, the forming or mixing of the pH-buffer may be made in the pH-buffer feeding equipment, such as in the pipeline. In one embodiment the components of the pH-buffer is fed from the tanks into the feeding equipment for combining the components in the feeding equipment. In one embodiment the pH-buffer feeding equipment comprises the mixing device, e.g. static mixer in the pipeline.

In one embodiment the filtration device (10) comprises an adjustment device to adjust pH of the pH-buffer between 4 to 10, preferably before the washing step. In one embodiment pH of pH-buffer is analyzed by an analyzing device. In one embodiment the filtration device (10) comprises a controlling means to determine pH of the pH-buffer and/or adjust pH of the pH-buffer between 4 to 10, preferably before the washing step. In one embodiment the controlling means comprises at least one analyzing device. In one embodiment the controlling means comprises at least one adjustment device. In one embodiment the controlling means comprises at least one analyzing device and at least one adjustment device. The controlling means, adjustment device or analyzing device may be arranged in connection with the pH-buffer feeding equipment or mixing device. Alternatively, the controlling means, adjustment device or analyzing device may be arranged before the pH-buffer feeding equipment. In one embodiment the adjustment device contain means for adding pH-buffer into the washing step and/or means for adding buffer agent into the pH-buffer. In one embodiment the adjustment device contain at least one adjustable valve for adjusting the feed of the pH-buffer into the washing step. In one embodiment the pH-buffer feeding equipment contain at least one adjustable valve for adjusting the feed of the pH-buffer into the washing step wherein the adjustable valve can be adjusted e.g. by means of controlling means or manually.

In one embodiment the forming of the pH-buffer is made as a batch process. In one embodiment the forming of the pH-buffer is made as a continuous process.

In one embodiment the filtration device comprises feeding tanks, a mixing device containing a mixing tank and a static mixer, and pH-buffer feeding equipment containing a pipeline and pump, and components of the pH-buffer from the feeding tanks and water are fed into the mixing tank in which the batch of the pH-buffer is formed by mixing with the static mixer, and the pH-buffer is fed from the mixing device into the washing step by means of the pH-buffer feeding equipment.

In one embodiment the filtration device comprises feeding tanks, pH-buffer feeding equipment containing a pipeline and pump, and a mixing device containing a static mixer in connection with the pH-buffer feeding equipment, and components of the pH-buffer from the feeding tanks and water are fed into the pipeline of the pH-buffer feeding equipment in which the pH-buffer is formed by mixing with the static mixer, and the pH-buffer is supplied into the washing step by the pump. Alternatively, components of the pH-buffer and water are not mixed in the pipeline when the pH-buffer is formed.

In one embodiment the pH-buffer is fed straightly, e.g. a feeding tank, into the washing step by means of the pH-buffer feeding equipment containing pipeline and pump.

In one embodiment temperature is over 50° C. during the filtration (4).

Preferably improved filterability, especially better filtration rate, achieved by means of the optimization leads to smaller pressure requirement in the filtration and to shorter filtration time. Then cheaper filters, e.g. based on size and type of device, may be used.

Preferably, pH of the lignin component is between 4-8 after the filtration (4), in one embodiment between 5-7. In one embodiment pH of the lignin component is over 5, in one embodiment over 6. In one embodiment pH of the lignin component is below 8, in one embodiment below 7. In a preferred embodiment pH of the lignin component is about 7.

In one embodiment the lignin component is dried after the filtration.

Further, the invention relates the lignin component which has specific properties, such as high particle size. Preferably, the lignin component has specific surface area between 0.1-1.0 $m^2/g$, preferably between 0.2-0.7 $m^2/g$, and more preferable between 0.3-0.6 m²/g. In the tests it is discovered that a particle size correlates with a specific surface area. Preferably, the lignin component has particle size which is bigger than in typical lignin products.

In one embodiment the lignin component is dried and/or grinded after the filtration. In one embodiment the lignin component which is dried and grinded into fine particles has bulk density between 200-800 g/cm³, preferably between 300-700 g/cm³, more preferable between 400-600 g/cm³, and in one embodiment about 500 g/cm³. In one embodiment the bulk density is determined so that the lignin component is dried and grinded into fine particles, and after that the grinded lignin component is put into flexible intermediate bulk container, from which a sample is taken, and the bulk density of the lignin component is measured from the sample. Preferably, the bulk density of the lignin component of the present invention is bigger than in typical lignin products known in the art.

Further, the invention relates the lignin component which is formed from lignin material by an acid treatment, wherein a lignin component is formed of lignin material so that the lignin material is treated by means of an acid composition in at least one acid treatment stage; and the lignin component is washed and neutralized by a pH-buffer during a filtration after the acid treatment, and pH in pH-buffer is between 4-10.

Preferably ash content of the lignin component is low.

Further, the invention relates a use of the lignin component obtainable by the method of the invention, wherein the lignin component is used as component in manufacturing a final product selected from a group consisting of activated carbon, carbon fiber, lignin composite, binder material, phenolic component, dispersion agent and their combinations.

Further, the invention relates a product which includes the lignin component obtainable by the method of the invention. In one embodiment, the product is selected from a group consisting of activated carbon, carbon fiber, lignin composite, e.g. lignin-plastic composite or lignin-fiber composite, binder material, phenolic component, dispersion agent and their combinations.

The invention is specially based on improving properties of the lignin component. When the lignin material is acid treated at one or more acid treatment stage by optimizing retention time, temperature and pH level, then the properties, e.g. purity, dry solids content, filterability, amounts of carbohydrates and ash, of the lignin component can be improved. Further, odour in the lignin component can be decreased. Further, when the lignin component is neutralized then the neutral lignin component can be achieved. Then it is provided the lignin component which is suitable to use in typical and special applications.

The method according to the present invention provides the neutral lignin component with good quality, such as purify and dry solid content. When improving the purify and increasing dry solids content of the lignin component so then it may be provided better properties of the lignin product and the final product. The filterability of the lignin component and the operating costs at following process stages, e.g. in drying, are improved.

It is important that the neutral lignin component with purify properties is achieved. The neutral lignin component is non-corrosive. Then additional process stages are not needed to neutralize lignin, when clean water is replaced by pH-buffer during the washing. Neutralization of the lignin product in additional process stage is extremely difficult since after the separate neutralization stage a dewatering of the lignin product is difficult to make. The production of neutral lignin is necessity for most applications. Further, even burning of the lignin component benefits from non-corrosive nature of this biofuel. Non-corrosive lignin component can be fed in application process without need for stainless/acid-proof steel as material in feeding systems. Also, standard material can be used in storage silos. Further, neutral lignin is less harmful to health.

The present invention provides an industrially applicable, simple and affordable way of making the lignin component from the lignin material. The method according to the present invention is easy and simple to realize as a production process. The method according to the present invention is suitable for use in the manufacture of the different lignin components from different lignin materials.

Further, the invention is described in more detail by the following examples 9-12 with reference to accompanying FIGS. 9-11.

Example 9

In this example and in FIG. 9, a lignin component (3) is formed by an acid treatment.

A starting lignin material (1), which is flash precipitated lignin, is treated by one acid treatment stage (2) which is an acid washing stage. Process conditions are following: temperature is about ° C., retention time over 6 hour and pH level is about 3. The acid washing is performed with $H_2SO_4$.

The lignin component (3) is filtrated after the acid washing (2) by pressure filtration (4). Temperature is over 50° C. during the filtration. During the filtration (4), the washing and neutralization (6) of the lignin component is made by pH-buffer solution (8) containing citrate, acetate and/or carbonate as a buffer agent. pH of the pH-buffer solution is about 5-7.

The neutral lignin component is achieved. The lignin component has specific surface area between 0.1-1.0 m²/g.

Example 10

In this example and in FIG. 10, a lignin component (3) is formed by an acid treatment.

A starting lignin material (1), which is flash precipitated lignin, is treated firstly at a pre-treatment stage 5 in which a re-slurry step and filtration are made, and then at one acid treatment stage (2) which is an acid washing stage. Process conditions are following: temperature is about 70° C., retention time over 6 hour and pH level is about 3. The acid washing is performed with $H_2SO_4$.

The lignin component (3) is filtrated after the acid washing (2) by pressure filtration (4). Temperature is over 50° C. during the filtration. During the filtration (4), the washing and neutralization (6) of the lignin component is made by pH-buffer solution (8) containing citrate, acetate and/or carbonate as a buffer agent. pH of the pH-buffer solution is about 6-7.

The neutral lignin component is achieved. The lignin component has specific surface area between 0.2-0.7 m²/g.

Example 11

In this example and in FIG. 11, a lignin component (7) formed by an acid treatment is filtrated by pressure filtration (4). Temperature is over 50° C. during the filtration. During the filtration (4), the washing and neutralization (6) of the lignin component is made by pH-buffer solution containing citrate as a buffer agent. pH of the pH-buffer solution is about 6-7.

The filtration, washing and neutralization is carried out in a filtration device (10). The filtration device (10) comprises a lignin feeding equipment for feeding the lignin component into the device, a filtrating step for forming a cake of the lignin component, a washing step for washing the cake and a final pressing step for pressing. Alternatively, the filtration device may comprise a pre-pressing step between the filtration step and the washing step. A lignin component product (3) is formed during the filtration.

The pH-buffer solution is formed from buffer agent (12a) containing citrate agent, NaOH (12b) and water (13) by mixing in a mixing device (11) comprising a mixing tank or a mixer in a container or a pipeline. The pH-buffer solution (8) is fed by pH-buffer feeding equipment (9) containing a feeding pipeline and a pump into a washing step of the filtration device (10) for washing and neutralizing a cake of the lignin component (7). Alternatively, the mixing of the pH-buffer solution may be made in the feeding equipment, such as in the pipeline.

The lignin component (3) may be dried and grinded.

Example 12

In this example, pH of the lignin component product is determined after the filtration. The pH is measured from the lignin components of the present invention and reference samples.

The lignin components of the present invention have been formed by means of examples 9 and 11. During the filtration the lignin products washed by the pH-buffer in which pH was 6. The pH-buffer contained citrate agent (2.1 g/l citric acid), NaOH (pH 6) and water.

The reference samples have been formed by similar means than trial points. During the filtration the lignin products were washed by clean water.

In the filtration feeding, compression and cake washing times were similar when comparing water and the pH-buffer in cake washing. pH of lignin based feed was about 2.5 before the filtration. Finally, a filter cake formed in the filtration was suspended in water (ds 25%), mixed for 1 h at 60° C., cooled to 25° C. and pH was measured.

Results are described in table 6.

TABLE 6

| Lignin sample | wet cake, kg | dry matter, % | water/ buffer | water/ buffer, used m3/t lignin | ph of lignin product |
|---|---|---|---|---|---|
| A | 3.5 | 69.9 | water | 1.7 | 3.36 |
| A | 3.2 | 71.5 | water | 2.7 | 3.36 |
| A | 3.4 | 71.7 | buffer | 2.5 | 3.73 |
| B | 2.7 | 79.7 | water | 2.3 | 3.51 |
| B | 2.6 | 75.5 | buffer | 2.6 | 4.16 |

It is discovered that pH of the lignin component can be increased by means of the method according to the present invention in comparison with reference samples.

Even when the pH of the pH-buffer was only 6, so lower than pH of clean water, the pH in the final lignin component was higher when the pH-buffer was used. This shows functionality of the invention. Ash and dry solids content of filter cake, time needed for cake washing and time needed for final pressing were similar to washing with clean water.

In these tests of examples 9-12 it was discovered that it may be produced the neutral lignin component with good properties, such as purify. It was discovered that dry solids content of the final lignin component cake and filterability and filtration rate time needed were in good level.

Further, it was discovered that lignin structure in the cake of the lignin component was in the form of big-single particles. This explains good filterability and high dry solids content.

Further, the invention relates the lignin component which has specific properties, such as high particle size. Preferably, the lignin component has specific surface area between $0.1$-$1.0$ $m^2/g$, preferably between $0.2$-$0.7$ $m^2/g$, and more preferable between $0.3$-$0.6$ $m^2/g$. In the tests it is discovered that a particle size correlates with a specific surface area. Preferably, the lignin component has particle size which is bigger than in typical lignin products.

In one embodiment the lignin component is dried.

In one embodiment the lignin component is dried and/or grinded after the filtration. In one embodiment the lignin component which is dried and grinded into fine particles has bulk density between 200-800 $g/cm^3$, preferably between 300-700 $g/cm^3$, more preferable between 400-600 $g/cm^3$, and in one embodiment about 500 $g/cm^3$. In one embodiment the bulk density is determined so that the lignin component is dried and grinded into fine particles, and after that the grinded lignin component is put into flexible intermediate bulk container, from which a sample is taken, and the bulk density of the lignin component is measured from the sample. Preferably, the bulk density of the lignin component of the present invention is bigger than in typical lignin products known in the art.

Example 13

In this example, specific surface areas of lignin components are determined from the lignin component of the present invention and reference samples.

The lignin components of the present invention have been formed by means of an acid treatment according to the present invention in which is used long retention time, over 6 h, and temperature over 70° C.

The reference samples have been formed by means of a typical acid treatment process in which is used low temperature and short retention time.

Results are described in table 7.

TABLE 7

| Sample | Specific surface area BET, $m^2/g$ |
|---|---|
| Reference 1 | 2.00 |
| Reference 2 | 3.35 |
| Lignin component of present invention | 0.54 |
| Lignin component of present invention | 0.37 |

The lignin component of the present invention has particle size which is bigger than in typical lignin products.

It was discovered that a particle size correlates with a specific surface area.

In the present invention it is discovered that the ash content and carbohydrates content can be reduced during the acid hydrolysis without major influence on structure of lignin. It is well known from the prior art that the carbohydrates can be removed from lignin using strong acid hydrolysis, but this will result in charring of lignin. Thanks to the invention the carbohydrates can be removed from lignin using mild conditions in the acid hydrolysis.

If lignin product has pH of 2.5, so an additional process stage may be needed to neutralize lignin product when close to neutral lignin is required in some downstream processing or applications. Separate neutralization stage would bring significant additional cost to process, since filtering of close to neutral lignin slurry is extremely slow by using standard methods. Clearly lower dry solids content of filter cake obtained after standard neutralization stage has biggest effect on raised operating costs. Thanks to the embodiments of the invention the neutral lignin product can be formed without separate neutralization stages.

The method according to the present invention is suitable in different embodiments to be used for making the most different kinds of lignin components from different lignin materials. The lignin component according to the present invention is suitable in different embodiments to be used in different final products.

The invention is not limited merely to the example referred to above; instead many variations are possible within the scope of the inventive idea defined by the claims.

The invention claimed is:

1. A method for making a lignin component from lignin material by an acid treatment, the method comprising:
   pre-treating the lignin material by slurrying the lignin material, wherein the lignin material is slurried at a temperature of 55-70° C. for less than 2 hours, and
   subjecting the lignin material to at least one acid treatment stage by mixing the lignin material with an acid composition to produce an acid treatment mixture, wherein at least one acid treatment stage has a retention time over 6 hours and wherein the acid treatment mixture is held at a temperature of over 60° C. and a pH of 0.5-4 for the retention time of the acid treatment in order to increase dry solids content of the lignin component and decrease ash and carbohydrates of the lignin component.

2. The method according to claim 1, wherein the acid treatment stage is acid washing or acid hydrolysis.

3. The method according to claim 1, wherein the acid composition includes $H_2SO_4$, other acid or acidifying chemical.

4. The method according to claim 1, wherein the lignin material is treated in the at least one acid treatment stage such that dry solids content of the lignin component is between 70-90%.

5. The method according to claim 1, wherein the pH level during the acid treatment stage is below 3.5.

6. The method according to claim 1, wherein the pH level during the acid treatment stage is between 2-4.

7. The method according to claim 1, wherein the retention time during the acid treatment stage is over 8 hours.

8. The method according to claim 1, wherein the temperature during the acid treatment stage is over 70° C.

9. The method according to claim 1, wherein the temperature during the acid treatment stage is 70-80° C.

10. The method according to claim 1, wherein the lignin component is formed from the lignin material by treating the lignin material at two acid treatment stages.

11. The method according to claim 1, wherein the method comprising: filtrating the acid treated lignin material after the acid treatment stage.

12. The method according to claim 11, wherein the acid treated lignin material is filtrated by pressure filtration or vacuum filtration.

13. The method according to claim 11, wherein a temperature is over 50° C. and pH is between 2 and 4 during the filtration.

14. The method according to claim 1, wherein the lignin material includes flash precipitated lignin.

15. The method according to claim 1, wherein the lignin material is treated in the at least one acid treatment stage such that carbohydrate content of the lignin component is under 1.0%.

* * * * *